No. 756,574. PATENTED APR. 5, 1904.
R. G. BROOKE.
FEED WATER REGULATOR.
APPLICATION FILED SEPT. 21, 1903.
NO MODEL. 10 SHEETS—SHEET 2.

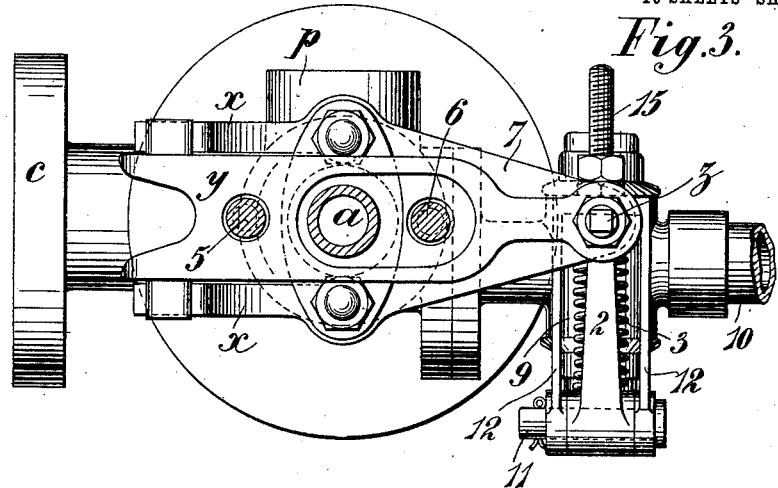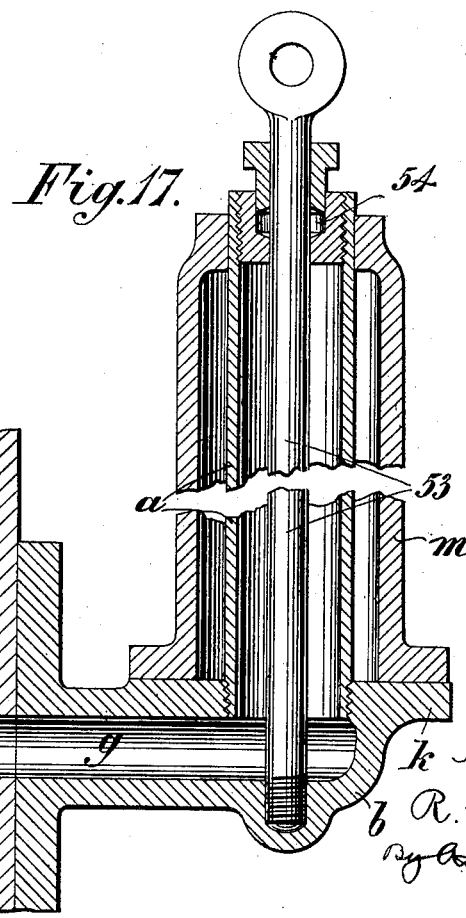

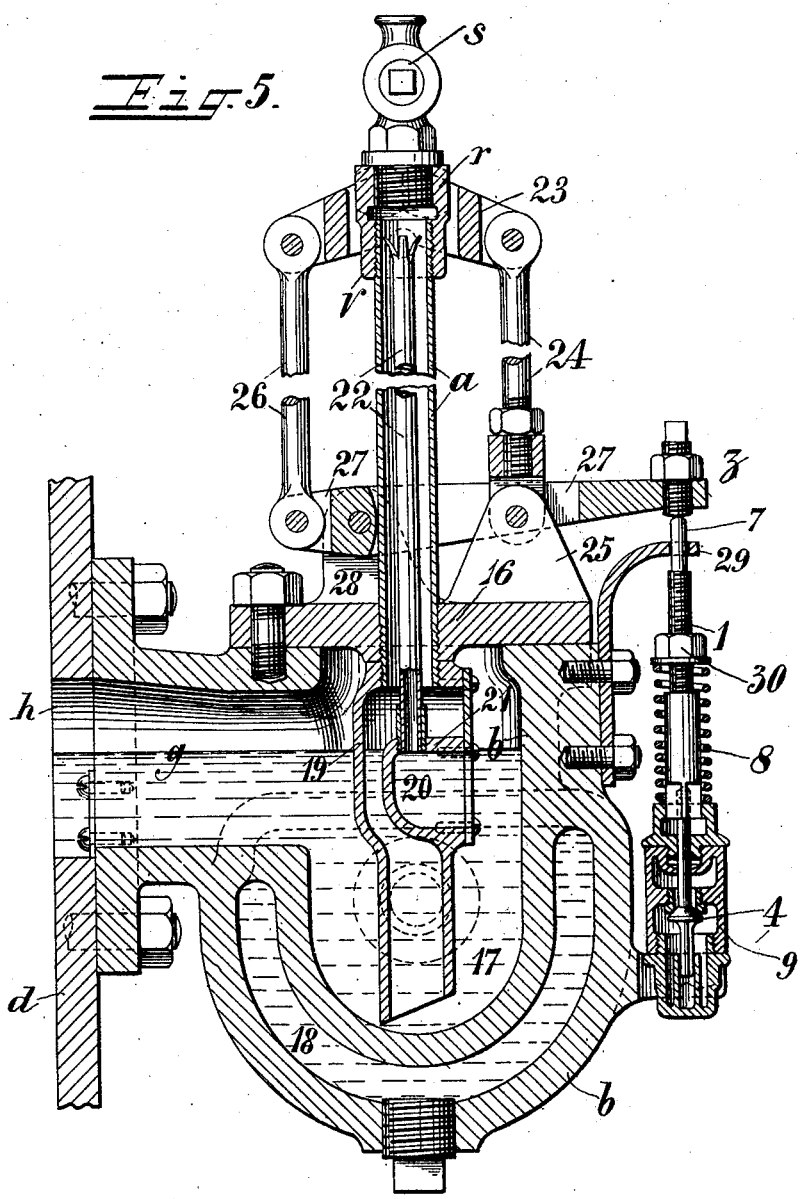

No. 756,574. PATENTED APR. 5, 1904.
R. G. BROOKE.
FEED WATER REGULATOR.
APPLICATION FILED SEPT. 21, 1903.
NO MODEL. 10 SHEETS—SHEET 5.

Witnesses
Inventor
R. G. Brooke,
By A. S. Pattison
Atty.

No. 756,574. PATENTED APR. 5, 1904.
R. G. BROOKE.
FEED WATER REGULATOR.
APPLICATION FILED SEPT. 21, 1903.
NO MODEL. 10 SHEETS—SHEET 7.

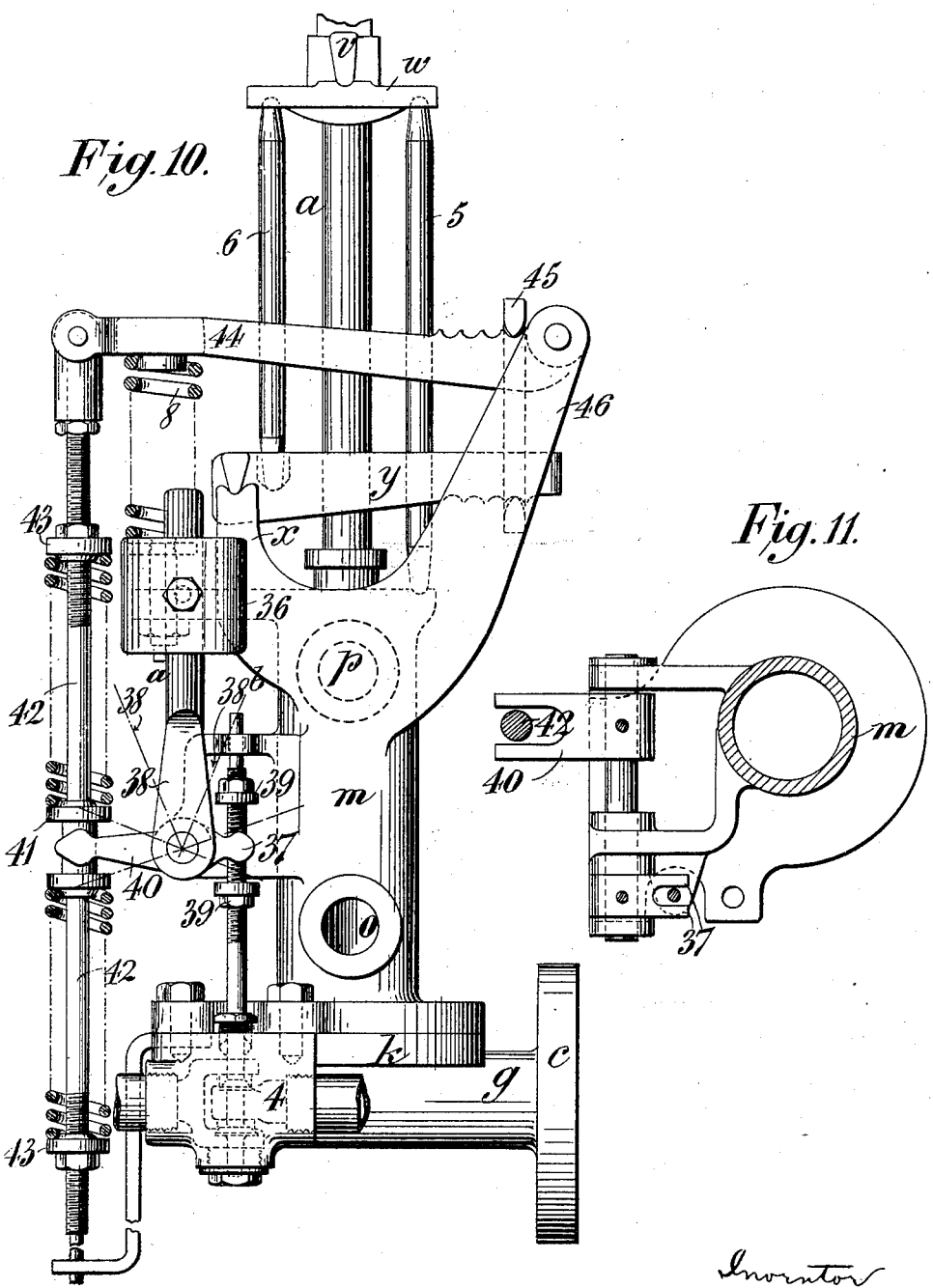

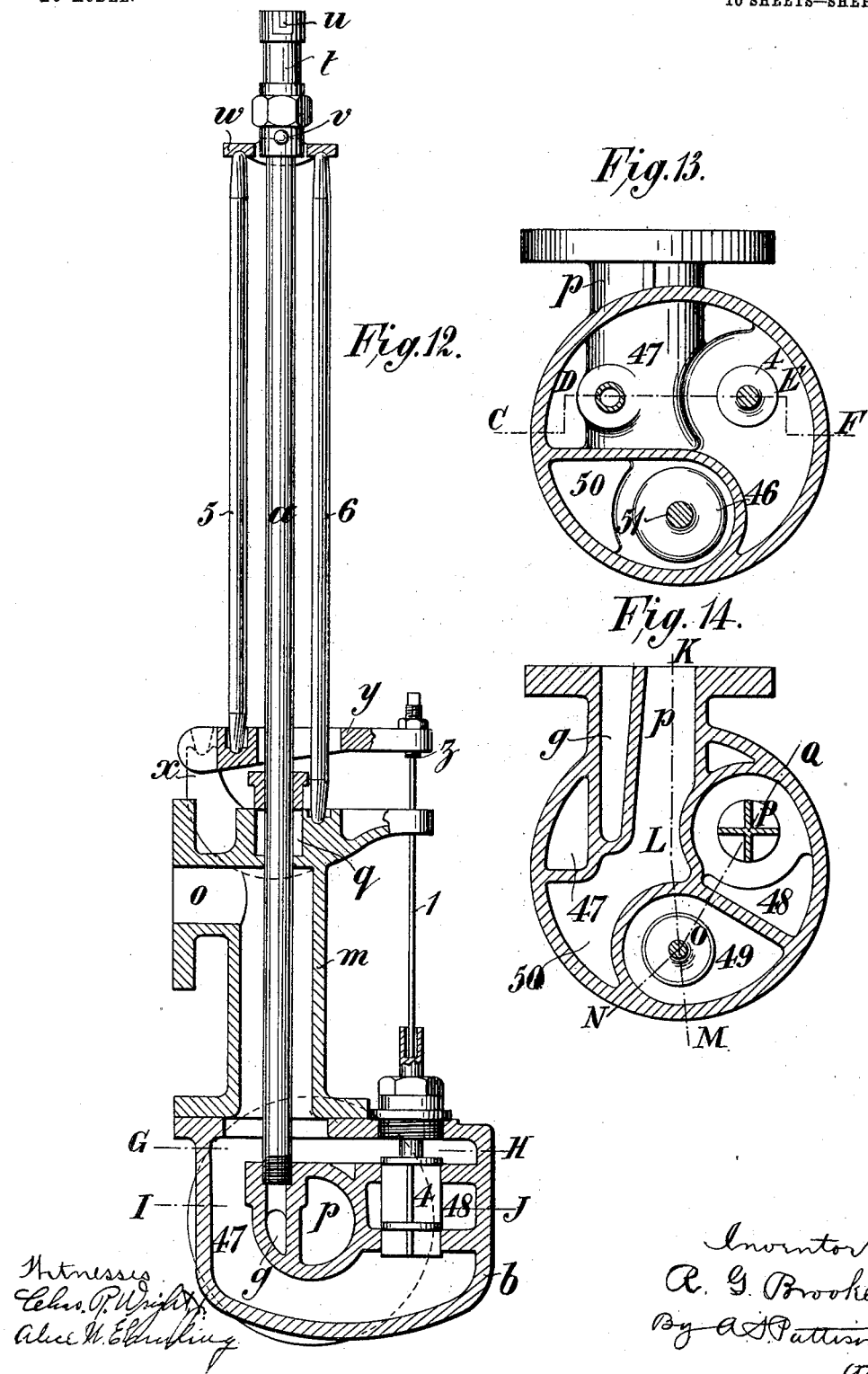

No. 756,574. PATENTED APR. 5, 1904.
R. G. BROOKE.
FEED WATER REGULATOR.
APPLICATION FILED SEPT. 21, 1903.
NO MODEL. 10 SHEETS—SHEET 10.

Witnesses
Inventor
R. G. Brooke

No. 756,574. Patented April 5, 1904.

UNITED STATES PATENT OFFICE.

ROBERT GRUNDY BROOKE, OF MACCLESFIELD, ENGLAND.

FEED-WATER REGULATOR.

SPECIFICATION forming part of Letters Patent No. 756,574, dated April 5, 1904.

Application filed September 21, 1903. Serial No. 174,093. (No model.)

*To all whom it may concern:*

Be it known that I, ROBERT GRUNDY BROOKE, a subject of the King of Great Britain and Ireland, residing at Macclesfield, in the county of Chester, England, have invented Improvements in or Relating to Apparatus for Automatically Regulating the Supply of Feed-Water to Steam-Boilers, of which the following is a specification.

This invention relates to automatic apparatus for directly or indirectly regulating or controlling the supply of feed-water to steam-boilers of the type wherein the regulation or control is effected by the operation of a valve by means of the expansion and contraction of a tube into which steam or water is admitted, according as the water-level in the boiler is slightly lower or higher than normal.

The invention has for its object to render such apparatus sensitive and quick in action, and for this purpose the expansion-tube is connected to the valve by multiplying-gear and means are provided for causing the water admitted into the expansion-tube to be cooled by feed or other water.

In apparatus according to this invention the valve that is automatically operated may directly regulate and control the supply of feed-water to the boiler by opening and closing the feed-pipe leading to the boiler or it may indirectly do so either by opening and closing the pipe for supplying steam to a pump or an injector or by opening and closing a valve adapted to permit the escape of water from a feed-pump or an injector.

Figure 1:
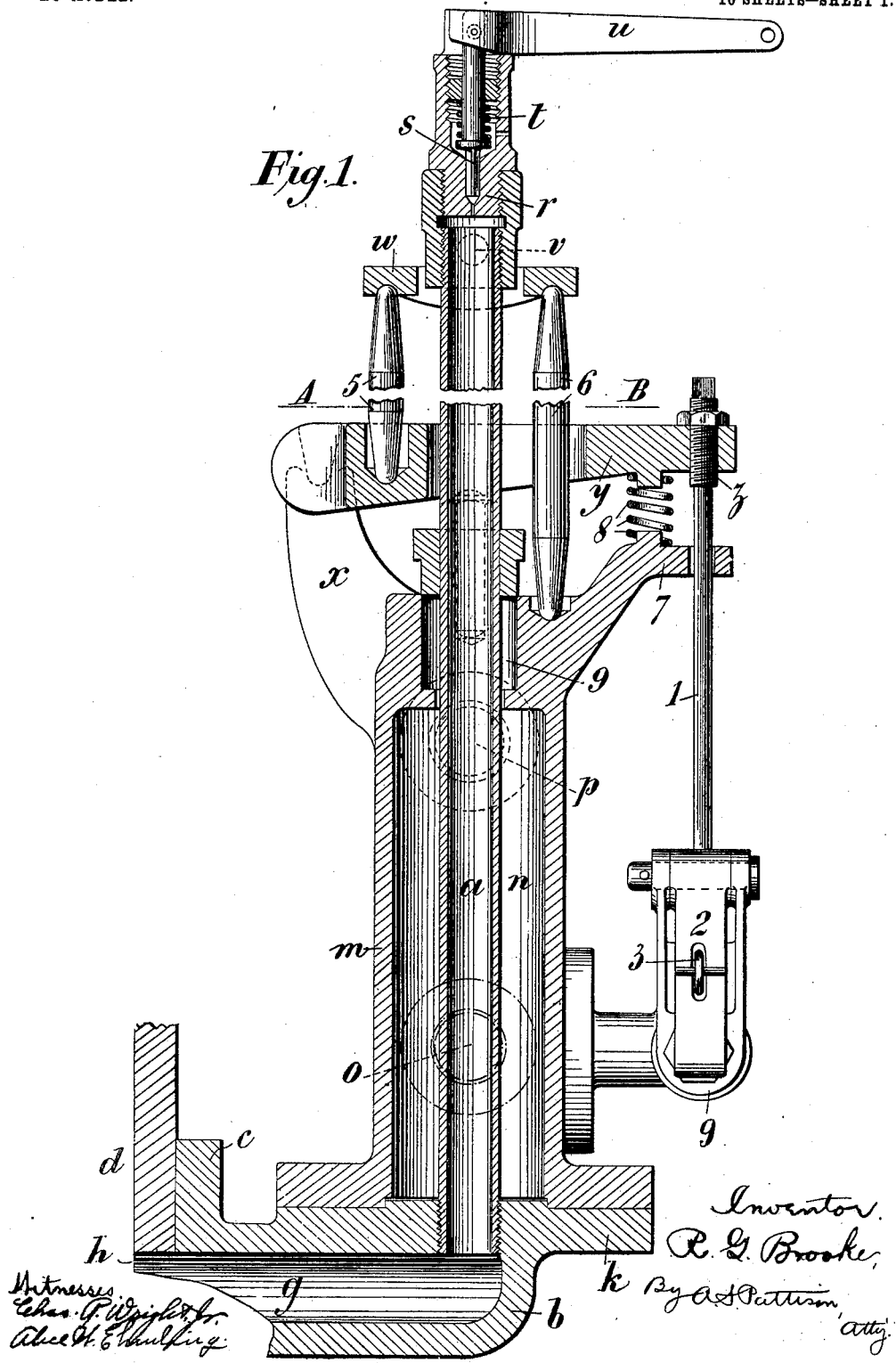
Figure 2:
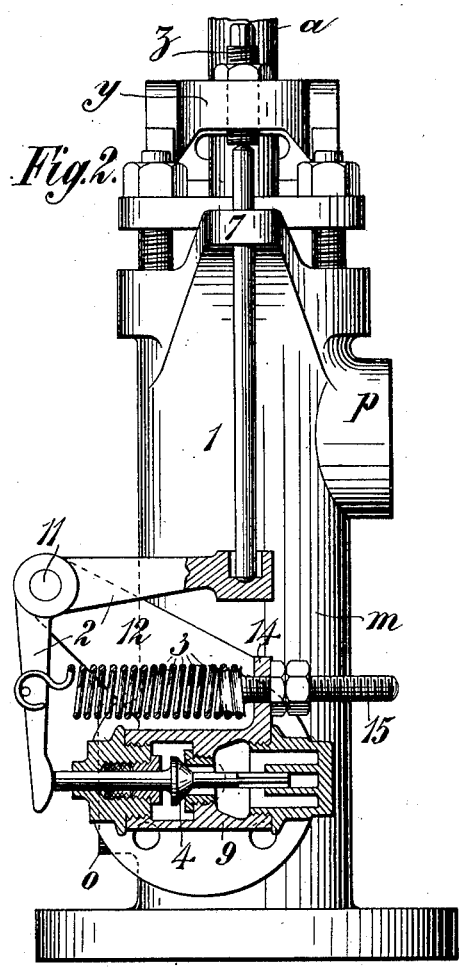
Figure 4:
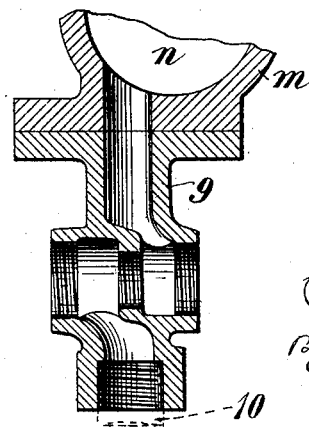

In the accompanying illustrative drawings, Figure 1 shows in vertical section an example of feed-water-regulating apparatus according to this invention. Fig. 2 is a sectional elevation taken at right angles to Fig. 1. Fig. 3 is a section corresponding to the line A B of Fig. 1, and Fig. 4 is a horizontal section of the valve-casing and the adjacent portion of the main casing of the apparatus. Fig. 5 shows in vertical section another example. Figs. 6 to 9, inclusive, show in vertical section various modifications of the apparatus, while Figs. 10 and 11 are respectively an elevation and a cross-section of another modification. Figs. 12 to 16, inclusive, represent another example, Figs. 12, 15, and 16 being vertical sections, and Figs. 13 and 14 horizontal sections. Fig. 17 is a vertical section illustrating a modification.

Figure 9:
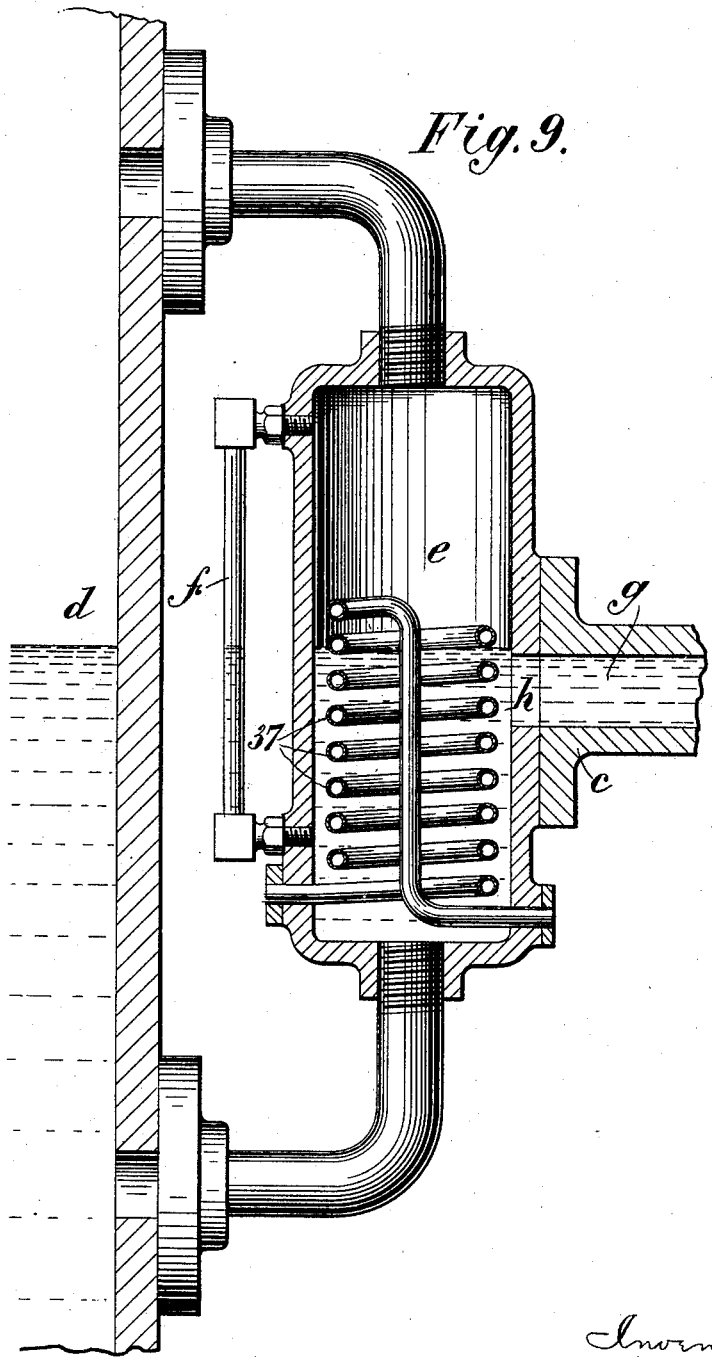

In the example shown in Figs. 1 to 4, inclusive, $a$ is a straight vertical expansion-tube fixed at its lower open end in the top of a holder $b$, consisting of a tubular casting having a flanged inlet branch $c$, whereby it can be secured to a boiler $d$ direct or, as shown in Fig. 9, to a pipe or column $e$, fixed externally to a boiler and provided with a gage-glass $f$ and other accessories, as heretofore usual, the passage $g$ through the branch $c$ being arranged to come opposite to a hole $h$, so arranged in the boiler $d$ or the pipe or column $e$ that steam or water will respectively enter the tubular casting $b$ and the expansion-tube $a$ when the level of water falls below or rises above the top of the hole $h$. The top of the tubular casting $b$ is formed with a horizontal flange $k$, to which is fixed the lower flanged end of a vertical pipe or tubular casting $m$, which surrounds the lower portion of the expansion-tube $a$, forming therewith an annular water-space $n$ and which is provided with lateral water inlet and outlet branches $o$ and $p$, respectively, (to the former of which the feed-pipe is secured,) and with an upper stuffing-box $q$, through which the expansion-tube $a$ extends. The upper end of the tube $a$, which terminates some distance above the stuffing-box $q$, is closed by a cap $r$, provided with a valve $s$, which can be opened, in opposition to the action of a spring $t$, by means of a hand-lever $u$, to liberate any air that there may be in the upper end of the tube $a$. The cap $r$ is also provided with oppositely-arranged lateral pins $v$, below and against which acts an annular bearing-collar $w$, that surrounds the tube $a$. Upon a laterally-arranged upwardly-extending bracket $x$ on the vertical pipe or casting $m$ bears one end of a lever $y$, that surrounds the tube $a$, and the other end of which is adapted to act through a vertically-adjustable screw $z$ upon the upper end of a rod 1, which acts with its lower end upon the horizontal arm of a bell-crank lever 2. The other and vertical arm of the lever 2 is pressed by a spring 3 against the outer end of the spindle of a valve 4. Between the bearing-collar $w$ and the fulcrum end of the hand-lever $y$ is a vertical rod 5, arranged at one side of the tube $a$, and between the collar $w$ and the upper end of the vertical pipe or casting $m$ is a second vertical rod 6, arranged at the opposite side of the tube $a$. Between the lever $y$ and a second lateral bracket 7, arranged on the pipe or casting $m$ opposite to the bracket $x$, is a spring 8, that tends to force the lever $y$ upward and serves to prevent any looseness between the vertical rods 5 and 6 and the parts against which they bear. The valve 4, which is shown, by way of example, as a cone valve, but which might be a double beat or other suitable valve, is arranged within a casing 9, to which is secured a by-pass pipe 10, Fig. 3. The lever 2 is mounted on a pin 11, that extends through eyes in brackets 12, projecting from the casing 9, and the spring 3 is secured to a bracket 14, projecting from the casing 9 by a stud 15, of which one end is adapted to fit the coil of the spring 3, while the remainder is screw-threaded and carries two nuts, by means of which the pressure on the spindle of the valve 4 can be regulated.

When the water-level in the boiler falls sufficiently to allow steam to enter the expansion-tube $a$ through the hole $h$ and the passage $g$, the tube $a$ expands upward and by thus allowing the vertical rods 5, and consequently the lever $y$, to rise enables the spring 3 by means of the lever 2 to move the valve, so as to close the way to the by-pass pipe 10, and thus to compel the whole of the feed-water to pass through the pipe or casting $m$ to the boiler until the passage $g$, leading to the expansion-tube $a$, becomes sealed by the rise of the water-level. When the passage $g$ is thus sealed, the steam in the expansion-tube $a$ is condensed, and as fresh steam cannot take the place of the condensed steam water rises from the boiler to fill the tube $a$ and in doing so is cooled by the feed-water flowing through the vertical pipe or casing $m$. The expansion-tube $a$ is thus cooled, and its consequent contraction by means of the vertical rods 5 and 6 and the lever $y$ depresses the rod 1, and thereby causes the valve 4 to open the way to the by-pass pipe 10, and so divert the feed-water from the boiler. The water thus diverted may pass back to the inlet of the pump or to the source from which the pump draws its supply, such as a tank, so that it will then simply circulate through the pump and the by-pass pipe 10 and past the valve 4. This arrangement may advantageously be used in cases where a single feed-pump is used with two or more boilers, each by-pass valve being controlled independently of the other or others and of the pump according to the height of the water in the corresponding boiler. If two or more boilers are to be fed by the same pump, the by-pass pipe must be provided with an additional valve weighted for a pressure somewhat in excess of that which is to obtain in the boilers, as otherwise if any one by-pass valve 4 were open pressure would be removed from the feed-pipe and none of the boilers would receive any feed.

In the example shown in Fig. 5 the expansion-tube $a$ is arranged vertically, as before, and has its lower and open end fixed in the cover 16 of a box or casing $b$, having a lateral inlet $g$ and a pocket 17, that extends below the inlet $g$ and normal water-lever and is provided with a jacket 18, through which to cool the water in the pocket the feed-water will pass on its way to the boiler. Secured to the lower end of the expansion-tube $a$ is a tubular extension 19, the lower end of which dips into the water in the pocket 17 and is preferably beveled, as shown. This tubular extension is formed with a lateral cavity 20, that is in communication with the interior of the box or casing $b$, and the top wall 21 of which is arranged at or about a height corresponding to the desired normal water-level in the boiler. To the top wall 21 is secured the lower open end of a vertical pipe 22, that extends upward inside the expansion-tube $a$ and serves to admit steam to the upper end of the tube $a$ when the water-level falls below the normal. The top of the expansion-tube is closed, as before, by a cap $r$, provided with two oppositely-arranged pins $v$, upon which is mounted to rock a lever 23, that surrounds the tube $a$. One end of this lever is jointed to the upper end of a link 24, that is adjustable in length, and the lower end of which is jointed to a pair of lugs 25 on the cover 16. The other end of the lever 23 is connected to the upper end of a second link 26, the lower end of which is jointed to the short arm of a lever 27, that is pivoted to another lug 28 on the cover 16 and surrounds the expansion-tube $a$, and the long arm of which is arranged to bear through an adjustable screw $z$, as before, upon the upper end of a valve-rod 1. The lower end of this rod is provided with a main valve 4, arranged to work in a casing 9 and control the supply of feed-water to the boiler by regulating the supply of steam to a pump or by merely opening and closing the pipe leading from the pump to the boiler if that pipe be provided with a by-pass pipe furnished with a weighted valve. The valve-rod 1 extends through a bracket 29, that is fixed to the casing $b$, and between the casing 9 and a nut 30 on a screw-threaded portion of the rod 1 is a coiled spring 8, that keeps the links 24 and 26 in tension, and thereby prevents any looseness between them and the levers 23 and 27. As will be seen, the arrangement in this case is such that when the water-level falls sufficiently to admit steam to the expansion-tube $a$ through the pipe 22 within it and the tube $a$ expands the expansion of the tube $a$ turns the levers 23 and 27, and thereby opens the valve 4, and when the tube contracts, owing to the condensation of the steam in the tube $a$ and the substitution of cooler water therefor, the levers 23 and 27 are turned in the opposite direction and permit the valve 4 to be closed by the spring 8 or the pressure of water or steam behind the valve.

When the apparatus shown in Fig. 5 is to be used for controlling the passage of steam to a pump, a by-pass may be formed, as by making perforations in the diaphragm containing the seating of the valve 4, in order to allow sufficient steam to pass even when the valve is closed to keep the pump from stopping. It is obvious that the multiplying-gear (shown in Fig. 5) could be used for closing instead of opening a valve 4 on the expansion of the tube $a$.

Figure 6:
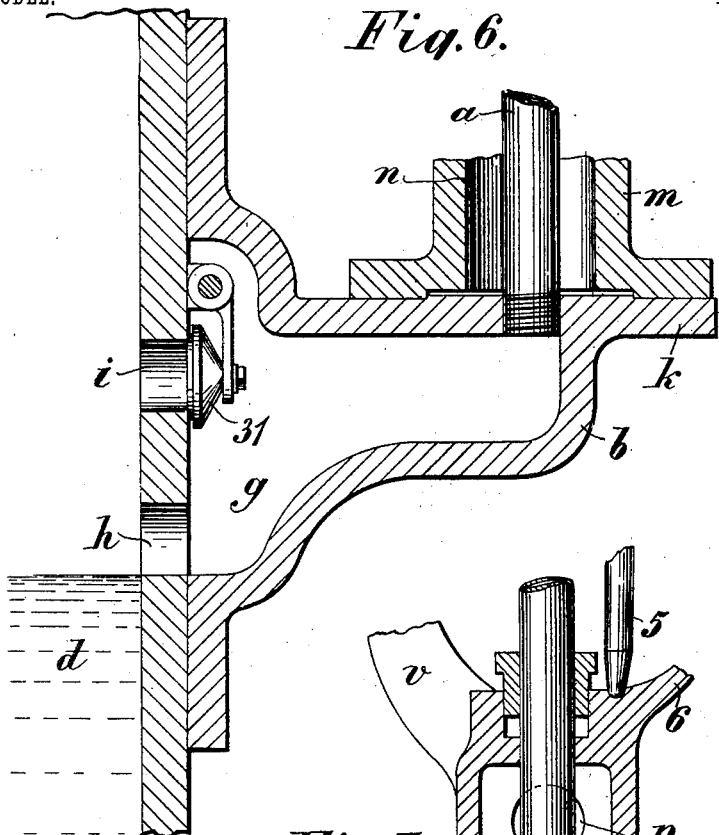

In cases where the limits of the working level of water in the boiler are required to be greater than would be the case if the holder $b$, carrying the expansion-tube $a$, were placed into communication with the boiler through a single hole $h$, Figs. 1 and 5, the holder may, as shown in Fig. 6, be constructed to cover two holes $h$ and $i$, arranged in the shell of the boiler $d$ at different levels and be provided with a light check-valve 31, arranged over the upper hole $i$ and to open into the holder $b$. The arrangement is such that the valve 31 allows steam to enter the expansion-tube $a$ after the water in the boiler has closed the lower hole $h$ and until it has risen and closed the upper hole $i$, whereupon water enters the tube $a$ and stops the supply of feed-water to the boiler $d$, whereupon the water-level in the boiler falls; but on account of the check-valve 31 water cannot leave the holder $b$ until the lower hole $h$ is uncovered, when steam will be allowed to take the place of the outflowing water.

Figure 7:
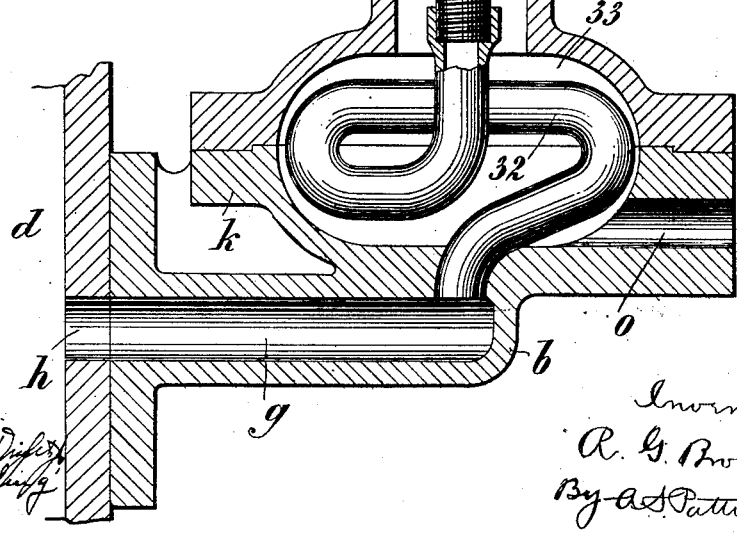
Figure 8:
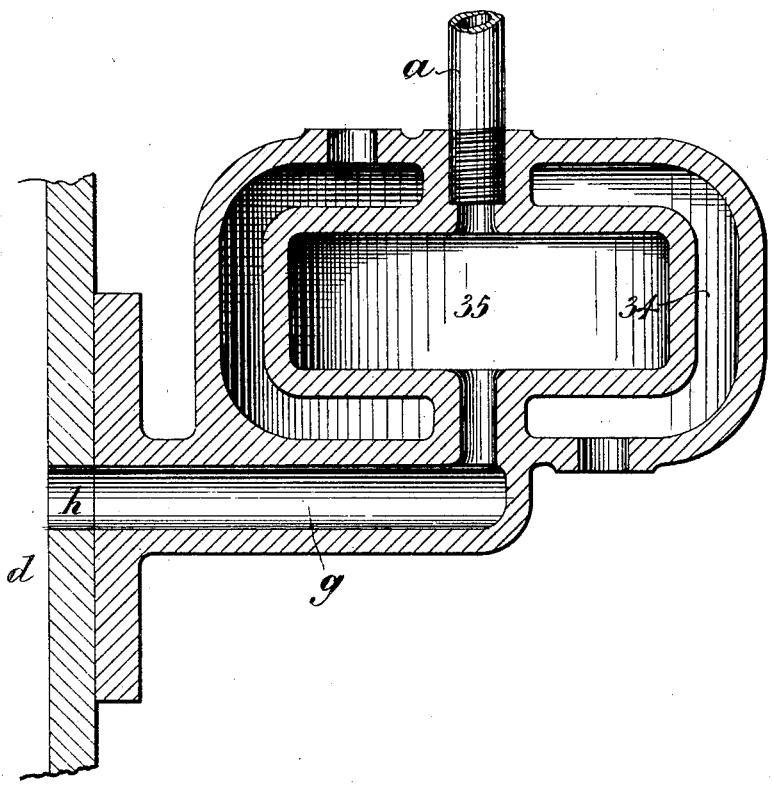

The cooling of the water entering the expansion-tube $a$ may be effected in various ways other than those hereinbefore mentioned. Thus the lower end of the tube may, as shown in Fig. 7, be connected to a coiled pipe 32, that is located in a water-circulating chamber 33 and is in communication with the passage $g$. Fig. 8 shows another arrangement wherein the lower end of the expansion-tube $a$ is connected to a casting comprising two chambers 34 and 35, of which the latter is arranged inside the former and communicates with the interiors of the tube $a$ and the passage $g$, and the outer of which—viz., 34—is adapted to have cooling water forced through it. When the apparatus is attached to a pipe or column $e$ in connection with a boiler $d$, as shown in Fig. 9, the pipe or column $e$ may be provided with a cooling-coil 37 or be otherwise adapted for cooling the water therein, the cooling of the water before or after entering the expansion-tube $a$ being in each case essential to the proper working of the apparatus. As hereinbefore stated, the expansion-tube may be provided with an internal pipe through which the cooling water may be passed.

When the expansion and contraction of the tube is to be utilized for starting and stopping an injector, the gear for connecting the expansion-tube with the valve is preferably such as to cause the valve to close and open suddenly, so as to open or close the steam-supply pipe quickly and enable the injector properly to start or stop working. Fig. 10 is an elevation, and Fig. 11 a cross-section, of an apparatus wherein the required quick opening and closing is affected by means of a tumbler 36, fixed on the upwardly-projecting arm of a bell-crank lever 38, the short arm 37 of which is arranged to open and close the valve 4 by acting on two nuts 39, adjustably secured on the rod thereof. The lever 38 is shown in its middle position, to either side of which it can fall into one or other of the positions indicated by the dotted center lines $38^a$ and $38^b$ as it is moved in one or other direction by a forked arm 40, which is fixed to the axle of the lever 38. The arm 40 is arranged to be acted upon by two collars 41, which are loose upon a spindle 42 and thrust against shoulders thereof by springs surrounding the spindle 42 and located between the collars 41 and nuts 43, fitting on screw-threaded portions of the spindle 42, which is jointed to one end of a lever 44, connected by a link 45 to a lever $y$, arranged to be depressed, like that shown in Fig. 1, by the contraction of the tube $a$ by means of two rods 5 and 6. The lever 44 is jointed to an arm 46, projecting upward from the casting $m$. The lever 44 is acted upon by a spring 8 to prevent looseness between the vertical rods 5 and 6 and the parts against which they bear. As hereinbefore indicated, when the tumbler-lever is moved slightly to the right or to the left of the position that it is shown as occupying it immediately falls into its corresponding extreme position and carries with it the valve 4, thereby opening and closing it suddenly to the full extent.

Figure 15:
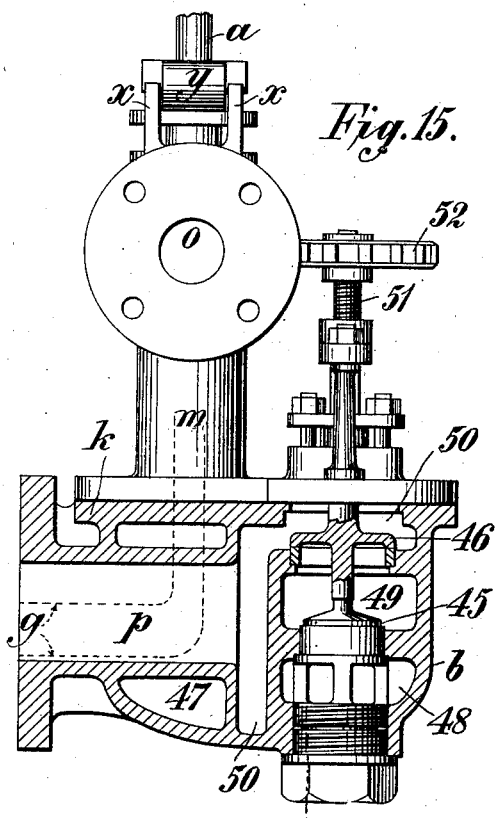
Figure 16:
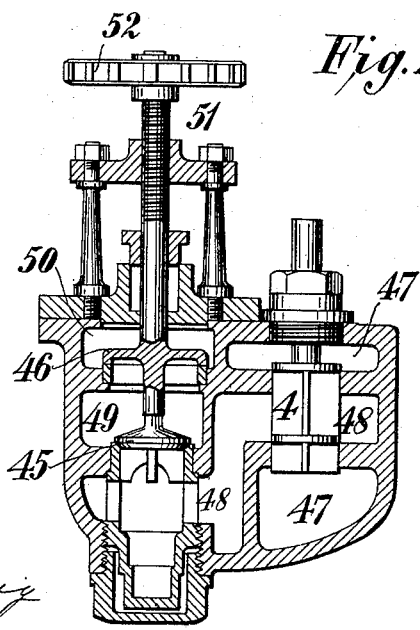

Figs. 12, 13, 14, 15, and 16 show an example of apparatus according to this invention wherein the tubular casting $m$, containing the expansion-tube, is mounted on a casting that contains the automatic valve 4, a non-return valve 45, a hand-stop valve 46, and also the outlet $p$ for the feed-water and the inlet $g$ for water and steam to the expansion-tube $a$. Fig. 12 shows the apparatus partly in vertical section corresponding to the line C D E F of Fig. 13, which is a horizontal section corresponding to the line G H of Fig. 12. Fig. 14 is a horizonal section corresponding to line I J of Fig. 12, and Figs. 15 and 16 are vertical sections corresponding to the lines K L M and N O P Q of Fig. 14. The connection of the tube $a$ with the valve 4 by means of rods 5 and 6 is similar to that shown in Fig. 1. The inlet $o$ for feed-water to the interior of the casting m is made in the upper portion of the casting m instead of the lower portion, as shown in Fig. 1, and the lower end of the interior of the casting m is in open communication with a chamber 47, formed within a casting b, which has within it partitions forming not only the chamber 47, but also chambers 48, 49, and 50 and likewise the outlet p for feed-water and the inlet g for water and steam to the expansion-tube a. The communication between the chamber 47 and the chamber 48 is controlled by the valve 4, which in this case is an equilibrium-valve adapted to allow feed-water to enter the chamber 48 from the chamber 47 both upward and downward. The communication between the chamber 48 and the chamber 49 is controlled by the non-return valve 45, and the communication between the chamber 49 and the chamber 50, which is in open communication with the outlet p, is controlled by the hand-valve 46, which has a downwardly-extending projection for controlling the extent of the opening of the valve 45, and is provided with a screw-threaded spindle 51 and a hand-wheel 52, by means of which it can be raised or lowered.

Fig. 17 shows how the expansion and contraction of a rod 53 are used to control the supply of feed-water to a boiler. In the example the rod is fixed at one end to the holder b and extends through the expansion-tube a and through a stuffing-box 54, carried by the free end of the tube a. The rod 53 is adapted in a manner similar to that of the tube a (illustrated in Fig. 1 or Fig. 5) to operate or control a valve. The rod may be solid or hollow.

What I claim is—

1. Apparatus for automatically regulating or controlling the supply of feed-water to a boiler, comprising a valve, a body adapted to expand and contract on increase and decrease of temperature, means for allowing water or steam from said boiler according to the position of the water-level in said boiler to come into contact with said body, means for cooling water so coming directly into contact with said body, and means adapted to enable the expansion and contraction of the substance of said body due to its heating and cooling by said steam and water to effect the opening and closing of said valve necessary for the required regulation or control.

2. Apparatus for automatically regulating or controlling the supply of feed-water to a boiler, comprising a valve, a body adapted to expand and contract on increase and decrease of temperature, means for allowing water or steam from said boiler according to the position of the water-level in said boiler to come into contact with said body, means for cooling water so coming directly into contact with said body, and multiplying-gear adapted to enable the expansion and contraction of the substance of said body due to its heating and cooling by said steam and water to effect the operation of said valve necessary for the required regulation or control.

3. Apparatus for automatically regulating or controlling the supply of feed-water to a boiler, comprising a valve, a rod adapted to expand and contract on increase and decrease of temperature, means for allowing water or steam from said boiler according to the position of the water-level in said boiler to come into contact with said rod, means for cooling water so coming into contact with said rod, and multiplying-gear adapted to enable the expansion and contraction of the substance of said rod due to its heating and cooling by said steam and water to effect the operation of said valve necessary for the required regulation or control, said gear comprising a lever pivotally connected to said rod at or near one end of said rod, a fixture at or near the other end of said rod, a second lever, means for enabling said second lever to operate said valve, and two rods of which one is arranged between and adapted to act upon said fixture and the first-mentioned lever while the other is arranged between and adapted to act upon the first-mentioned lever and said second lever.

4. Apparatus for automatically regulating or controlling the supply of feed-water to a boiler, comprising a valve, a hollow rod or tube adapted to expand and contract on increase and decrease of temperature, means for allowing water or steam from said boiler according to the position of the water-level in said boiler to pass into said hollow rod or tube, means for cooling water so passing into said hollow rod or tube, means adapted to enable the expansion and contraction of the substance of said hollow rod or tube due to its heating and cooling by said steam and water to effect the opening and closing of said valve necessary for the required regulation or control.

5. Apparatus for automatically regulating or controlling the supply of feed-water to a boiler, comprising a valve, a hollow rod or tube adapted to expand and contract on increase and decrease of temperature, means for allowing water or steam from said boiler according to the position of the water-level in said boiler to pass into said hollow rod or tube, a chamber adapted to enable cool water to be passed through it and to cause such water during its passage therethrough to cool water passing into said hollow rod or tube as aforesaid, and means adapted to enable the expansion and contraction of the substance of said hollow rod or tube due to its heating and cooling by said steam and water from said boiler to effect the opening and closing of said valve necessary for the required regulation or control.

6. Apparatus for automatically regulating or controlling the supply of feed-water to a boiler, comprising a valve; a body adapted to expand and contract on increase and decrease of temperature; means for allowing water or steam from said boiler according to the position of the water-level in said boiler to come into contact with said body, said means comprising two inlets from said boiler and a valve adapted to allow water or steam to pass from said boiler to said body through the upper of said inlets but to prevent it from returning therethrough; means for cooling water so coming into contact with said body; and means adapted to enable the expansion and contraction of said body due to its heating and cooling by said steam and water to effect the opening and closing of said valve necessary for the required regulation or control.

7. Apparatus for automatically regulating or controlling the supply of feed-water to a boiler, comprising a valve, a body adapted to expand and contract on increase and decrease of temperature, means for allowing water or steam from said boiler according to the position of the water-level in said boiler to come into contact with said body, means for cooling water so coming into contact with said body, mechanism adapted to enable the expansion and contraction of said body due to its heating and cooling by said steam and water to effect the sudden opening and closing of said valve necessary for starting and stopping an injector for the purpose of the required regulation or control.

8. Apparatus for automatically regulating or controlling the supply of feed-water to a boiler, comprising a valve, a body adapted to expand and contract on increase and decrease of temperature, means for allowing water or steam from said boiler according to the position of the water-level in said boiler to come into contact with said body, means for cooling water so coming into contact with said body, and mechanism comprising a tumbler and means for enabling said tumbler to be moved to opposite sides of a dead position by the expansion and contraction of said body due to its heating and cooling by said steam and water and on being so moved to effect the sudden opening and closing of said valve necessary for starting and stopping an injector for the purpose of the required regulation or control.

9. Apparatus for automatically regulating or controlling the supply of feed-water to a boiler, comprising a valve, a body adapted to expand and contract on increase and decrease of temperature, means for allowing water or steam from said boiler according to the position of the water-level in said boiler to come into contact with said body, means for cooling water so coming into contact with said body, and mechanism adapted to enable the expansion and contraction of said body due to its heating and cooling by said steam and water to effect the sudden opening and closing of said valve necessary for starting and stopping an injector for the purpose of the required regulation or control, said mechanism comprising multiplying-gear connected to said body, a rod connected to said multiplying-gear, a pair of tappets loose on said rod, means for pressing said tappets toward each other, a valve-rod, a pair of abutments on said valve-rod, a tumbler adapted to move about a horizontal axis, and arms which are secured to said tumbler and of which one is adapted to engage with said pair of tappets and to move said tumbler through its dead position and of which the other is adapted to engage with said pair of abutments and thereby to operate said valve.

10. Apparatus for automatically regulating or controlling the supply of feed-water to a boiler, comprising a valve; a hollow rod or tube adapted to expand and contract on increase and decrease of temperature; a casing surrounding said hollow rod or tube and adapted to be passed through by feed-water; a casting in which the lower end of said hollow rod or tube is secured and which forms an inlet for feed-water in communication with the interior of said casing, an outlet for feed-water, three chambers of which one the inlet-chamber is in communication with said inlet and another the outlet-chamber is in communication with said outlet, and an inlet for steam and water from said boiler to the interior of said hollow rod or tube; a hand-valve, said hand-valve and aforesaid valve being adapted to control the passage of feed-water from said inlet-chamber to said outlet-chamber; and means adapted to enable the expansion and contraction of said hollow rod or tube due to its heating and cooling by said steam and water from said boiler to effect the opening and closing of said valve necessary for the required regulation or control.

11. Apparatus for automatically regulating or controlling the supply of feed-water to a boiler, comprising a valve, a hollow rod or tube adapted to expand and contract on increase and decrease of temperature, means for allowing water or steam from said boiler according to the position of the water-level in said boiler to pass into said hollow rod or tube, means for cooling water so passing into said hollow rod or tube, a valve at the upper end of said hollow rod or tube by means of which air may be allowed to escape therefrom, and means adapted to enable the expansion and contraction of the substance of said hollow rod or tube due to its heating and cooling by said steam and water to effect the opening and closing of said valve necessary for the required regulation or control.

12. Apparatus for automatically regulating or controlling the supply of feed-water to a boiler, comprising a valve, an upwardly-extending hollow rod or tube open at its lower end and closed at its upper end, a passage connected at its one end to the lower end of said hollow rod or tube and adapted to be connected at its other end to said boiler, a casing surrounding said hollow rod or tube and provided with an inlet and an outlet for cooling water, and means adapted to enable the expansion and contraction of the substance of said hollow rod or tube due to its heating and cooling by steam and water arriving from said boiler through said passage to effect the opening and closing of said valve necessary for the required regulation or control.

13. Apparatus for automatically regulating or controlling the supply of feed-water to a boiler, comprising a valve, an upwardly-extending hollow rod or tube open at its lower end and closed at its upper end, a passage connected at its one end to the lower end of said hollow rod or tube and adapted to be connected at its other end to said boiler, a casing surrounding said hollow rod or tube and provided with an inlet and an outlet for cooling water, and multiplying-gear adapted to enable the expansion and contraction of the substance of said rod due to its heating and cooling by steam and water arriving from said boiler through said passage to effect the operation of said valve necessary for the required regulation or control, said gear comprising a lever pivotally connected to said rod at or near one end of said rod, a fixture at or near the other end of said rod, a second lever, means for enabling said second lever to operate said valve, and two rods of which one is arranged between and adapted to act upon said fixture and the first-mentioned lever while the other is arranged between and adapted to act upon the first-mentioned lever and said second lever.

14. Apparatus for automatically regulating or controlling the supply of feed-water to a boiler, comprising a valve; a hollow rod or tube adapted to expand and contract on increase and decrease of temperature; a casing surrounding said hollow rod or tube and adapted to be passed through by feed-water; a casting in which the lower end of said hollow rod or tube is secured and which forms an inlet for feed-water in communication with the interior of said casing, four chambers of which one the inlet-chamber is in communication with said inlet and another the outlet-chamber is in communication with said outlet, and an inlet for steam and water from said boiler to the interior of said hollow rod or tube; a hand-valve, said hand-valve and aforesaid valve being adapted to control the passage of feed-water from said inlet-chamber to said outlet-chamber; a valve adapted automatically to prevent the passage of water from said outlet-chamber to said inlet-chamber; and means adapted to enable the expansion and contraction of said hollow rod or tube due to its heating and cooling by said steam and water from said boiler to effect the opening and closing of said valve necessary for the required regulation or control.

Signed at Scarborough, in the county of York, England, this 5th day of September, 1903.

ROBERT GRUNDY BROOKE.

Witnesses:
G. BARNARD BLACK,
CHARLES WM. COATES.